(12) United States Patent
Huang

(10) Patent No.: US 10,042,179 B2
(45) Date of Patent: Aug. 7, 2018

(54) QUICK-REPLACEMENT STRUCTURE OF GLASSES LENSES

(71) Applicant: TSAIR YUARN INDUSTRIAL CO., LTD., Tainan (TW)

(72) Inventor: Pao-Ming Huang, Tainan (TW)

(73) Assignee: Tsair Yuarn Industrial Co., Ltd., Tainan (TW)

( * ) Notice: Subject to any disclaimer, the term of this patent is extended or adjusted under 35 U.S.C. 154(b) by 180 days.

(21) Appl. No.: 15/142,405

(22) Filed: Apr. 29, 2016

(65) Prior Publication Data

US 2017/0146814 A1  May 25, 2017

(30) Foreign Application Priority Data

Nov. 19, 2015 (TW) .............................. 104218566 U

(51) Int. Cl.
*G02C 1/08* (2006.01)

(52) U.S. Cl.
CPC ........... *G02C 1/08* (2013.01); *G02C 2200/06* (2013.01); *G02C 2200/08* (2013.01)

(58) Field of Classification Search
CPC . G02C 1/00; G02C 1/08; G02C 5/006; G02C 5/22; G02C 5/229; G02C 5/2281; G02C 2200/04; G02C 2200/06; G02C 2200/08; G02C 2200/18
USPC .................................................. 351/90–102
See application file for complete search history.

(56) References Cited

U.S. PATENT DOCUMENTS

2010/0085533 A1* 4/2010 Calilung .................. G02C 1/06
351/90

FOREIGN PATENT DOCUMENTS

| TW | M407402 U1 | 7/2011 | |
| TW | 422080 | * 2/2012 | ............... G02C 5/00 |
| TW | M422080 U1 | 2/2012 | |

* cited by examiner

*Primary Examiner* — Ricky Mack
*Assistant Examiner* — Gary O'Neil
(74) *Attorney, Agent, or Firm* — Rosenberg, Klein & Lee

(57) ABSTRACT

A quick-replacement structure of glasses lenses comprises an upper frame, a lower frame, and a fastener. The upper frame comprises a groove at the middle part, and a slot formed at the bottom of the groove and forwardly penetrating the frame wall. The lower frame comprises an insert upwardly extended from a middle section and a hole in the insert. The fastener is corresponded to the groove shape, and an inserted pin is forwardly extended from the fastener wall. When the both ends of the upper frame and the lower frame are hinged on each other, the insert of the lower frame is inserted into an upper lens recess, and the hole in the insert is corresponded to the slot of the groove, then the inserted pin of the fastener is through the slot and the hole, quickly clamping the lenses between the upper frame and the lower frame.

3 Claims, 5 Drawing Sheets

QUICK-REPLACEMENT STRUCTURE OF GLASSES LENSES

BACKGROUND OF THE INVENTION

Field of the Invention

The present invention relates to a quick-replacement structure of glasses lenses. More particularly, the glasses comprise an upper frame and a lower frame, which are pivoted on each other, for quickly assembling and disassembling the lenses.

Description of Related Art

When the currently glasses frame in the market is connected with the lenses, it is nothing more than a radial groove formed at the glasses frame. After the lenses are put into the lens mounting hole, which is enclosed by the glasses frame, the gap on the radial groove is closed by the screw, thereby stably assembling the lenses to the glasses frame. Or, the lenses are embedded into the lens mounting hole, which is enclosed by the glasses frame, directly by the assembling skill, and this method is usually suitable for the plastic frame. However, the mounting method which has the locking step via the screw, the small screwdriver needs for locking the screw, resulting that it is not convenient to replacement and it is time-consuming. With regard to the mounting method for the plastic frame, the assembly steps are usually completed by the employee that knowing the assembling skills. For the general consumer, it is not easy to operate and the lenses are easily damaged. Accordingly, when the lenses are replaced, the glasses is repaired by the professionals or returned to the original factory, unable to achieving the purpose of immediate replacement, so it is trouble and not convenient.

Therefore, a glasses structure, which is capable to quickly replace the lenses, has been developed. Please refer to the TW Patent application with the Issue No. TW M422080U "Improvement of glasses frame structure for quickly replacing the lenses", which discloses a movable frame set at the bottom of the glasses frame. The movable frame is hinged on the glasses frame, so the lenses can be placed among the glasses frame and the movable frame. Then, the latch is inserted into the slot on the movable frame to stably assemble the lenses to the glasses frame. When the lenses are replaced, the bump of the latch is pressed for detaching the latch from the movable frame; meanwhile, one side of the movable frame is separated from the glasses frame to take out the lenses, achieving the purpose of quickly replacing lenses.

However, the foregoing structure described in the TW Patent application with the Issue No. TW M422080U "Improvement of glasses frame structure for quickly replacing the lenses" only can be used in the twin-lens glasses, cannot be used in the glasses with single lens.

Please refer to the TW Patent application with the Issue No. TW M407402U "Connection structure of lenses and glasses frame", which is developed by the inventor of the present invention. In that patent application, the center parts of the frame and the lenses are corresponded to each other and engaged on each other by a buckle set between them. Via the engagement of the buckle, the lenses are stably connected with the frame and not separated from the frame.

However, the connection structure described in the TW Patent application with the Issue No. TW M407402U only can be used in the glasses frame without the lower frame. For the glasses frame having the upper and lower frame, the structure described in the TW Patent application with the Issue No. TW M407402U cannot satisfy the customer's demand.

Now, in view that the prior art, the TW Patent application with the Issue No. TW M422080U "Improvement of glasses frame structure for quickly replacing the lenses", only can be used in the twin-lens glasses and the other prior art, the TW Patent application with the Issue No. TW M407402U "Connection structure of lenses and glasses frame", only can be used in the glasses frame having the upper frame, the application is limited. Therefore, a quick-replacement structure of glasses lenses, which can be applicable in single-lens or twin-lens glasses, is provided.

SUMMARY OF THE INVENTION

Accordingly, the object of the present invention is related to a quick-replacement structure of glasses lenses, which is applicable to the glasses with single-lens or twin-lens. The both ends of the upper frame and the lower frame are as the pivot to rotate the upper frame and the lower frame toward each other for clamping the lenses or to rotate the upper frame and the lower frame away from each other for disassembling the lenses, achieving the purpose of quick-replacement of the lenses.

For the above object, a quick-replacement structure of glasses lens comprises an upper frame, a lower frame, and a fastener. The both ends of the lower frame are hinged on the both ends of the upper frame. The upper frame comprises a groove at the middle part, a slot formed at the bottom of the groove and forwardly penetrating the frame wall and an upper lens recess at the bottom of the upper lens frame, wherein the sectional shape of the groove is reversed L-shaped. The lower frame comprises an insert upwardly extended from a middle section, a hole in the insert, and a lower lens recess at the top of the lower frame. The fastener is corresponded to the groove shape and formed with an inserted pin forwardly extended from the fastener wall, wherein the sectional shape of the fastener being reversed L-shaped. When the both ends of the upper frame and the lower frame are hinged on each other, the insert of the lower frame is inserted into the upper lens recess, and the hole in the insert is corresponded to the slot of the groove, then the inserted pin of the fastener is through the slot and the hole, quickly clamping the lenses between the upper frame and the lower frame.

According to an embodiment of the present invention, the both ends of the upper frame comprise a first pivot hole, the both ends of the lower frame comprise two second pivot holes, and a pin is inserted through the first pivot hole and the two second pivot holes to hinge the upper frame and the lower frame on each other.

According to an embodiment of the present invention, the pin comprises a head part, a pole part, and a ball part at the end of the pole part, and the pole part and the ball part have several trenches for elastically expanding or tightening themselves.

The advantages of the quick-replacement structure of glasses lenses of the present invention are described as below.

By the setting of the upper frame, the lower frame and the fastener, the single-lens or twin-lens have the quick-replacement structure for convenient to assemble and disassemble.

DETAILED DESCRIPTION OF THE PREFERRED EMBODIMENT

Figure 1:
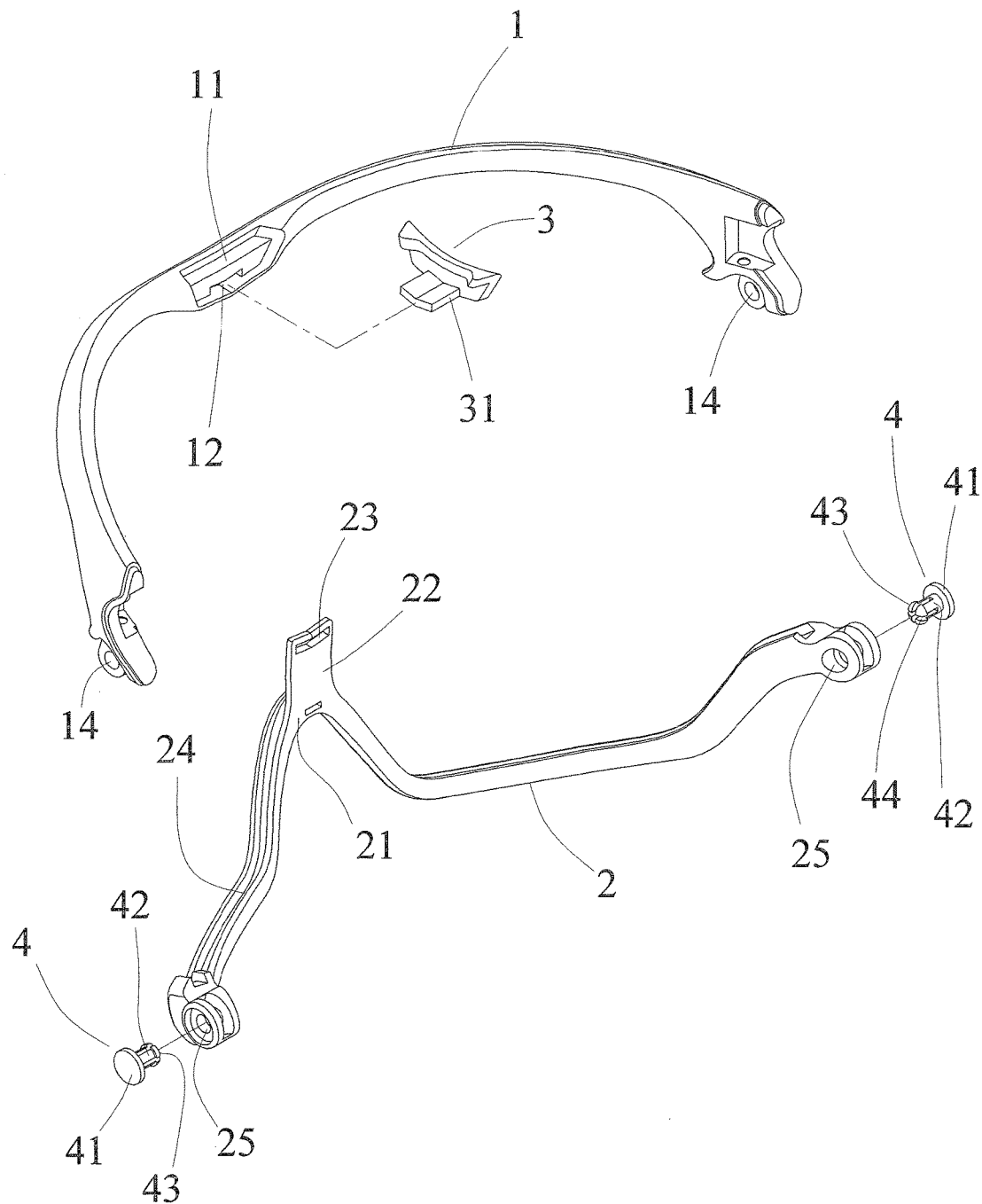
FIG. 1 is an exploded perspective view of a quick-replacement structure of glasses lenses according to an embodiment of the present invention.

Please refer to FIG. 1, which is an exploded perspective view of a quick-replacement structure of glasses lenses according to an embodiment of the present invention. The quick-replacement structure of glasses lenses comprises an upper frame 1, a lower frame 2, and a fastener 3. The both ends of the lower frame 2 are hinged on the both ends of the upper frame 1.

The upper frame 1 comprises a groove 11 at the middle part, a slot 12 formed at the bottom of the groove 11 and forwardly penetrating the wall of the upper frame 1, an upper lens recess 13 at the bottom of the upper lens frame 1, and a first pivot hole 14 formed at the both ends of the upper frame 1. The sectional shape of the groove 11 is reversed L-shaped.

The lower frame 2 comprises an insert 22 upwardly extended from a middle section 21, a hole 23 in the insert 22, a lower lens recess 24 at the top of the lower frame 2, and two second pivot holes 25 formed at the both ends of the lower frame 2.

The fastener 3 is correspond to the shape of the groove 11 and formed with an inserted pin 31 forwardly extended from the wall of the fastener 3. The sectional shape of the fastener is reversed L-shaped.

When quick-replacement structure of glasses lenses of the present invention is assembled, the first pivot holes 14 at the both ends of the upper frame 1 is aligned with the second pivot holes 25 at the both ends of the lower frame 2, then a pin 4 is inserted through the first pivot hole 14 and the second pivot holes 25 for hinging the both ends of the upper frame 1 and the lower frame 2 on each other, making the pin 4 as a pivot.

Figure 5:
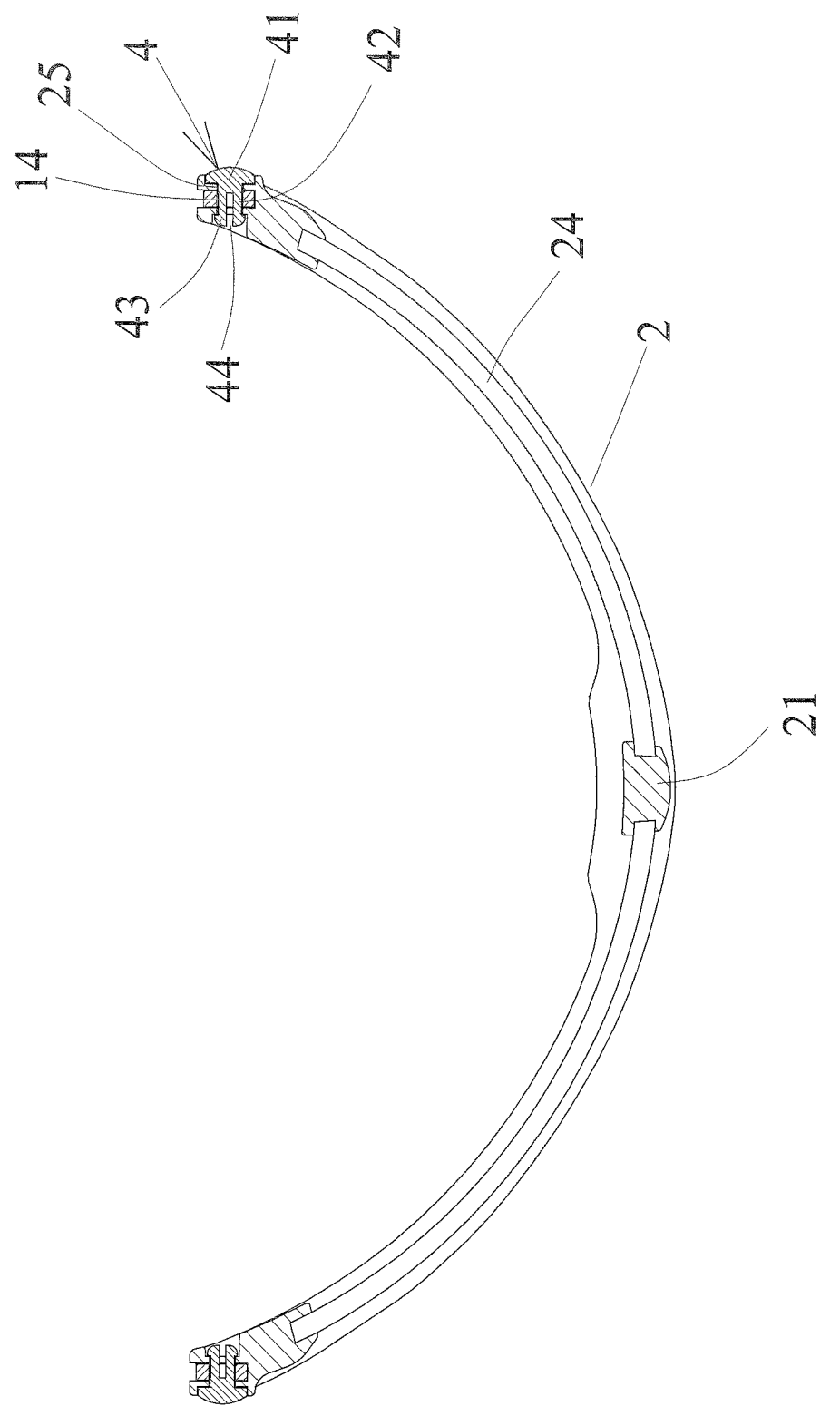
FIG. 5 is a top view of the hinged connection between the both ends of the upper frame and the lower frame according to an embodiment of the present invention.

Please refer to FIG. 1 and FIG. 5. The pin 4 comprises a head part 41, a pole part 42, and a ball part 43 at the end of the pole part 42. The pole part 42 and the ball part 43 have several trenches 44 for elastically expanding or tightening themselves, making the pin 4 easily insert into the first pivot hole 14 and the second pivot holes 25 and not easily drop off.

Figure 2:
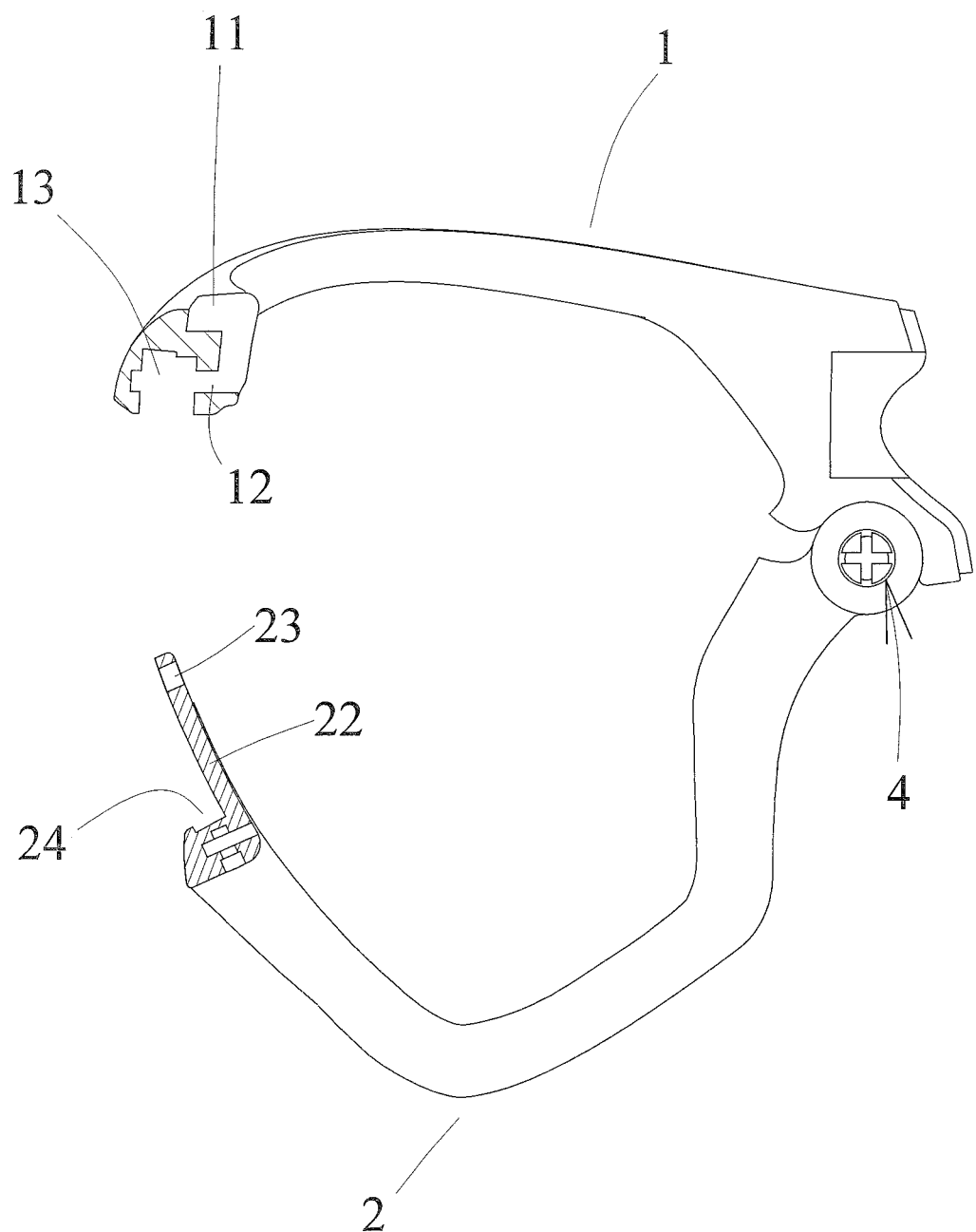
FIG. 2 is a side view of a quick-replacement structure of glasses lenses according to an embodiment of the present invention when the both ends of the upper frame and the lower frame are hinged on each other and the middle parts of them are kept away.
Figure 3:
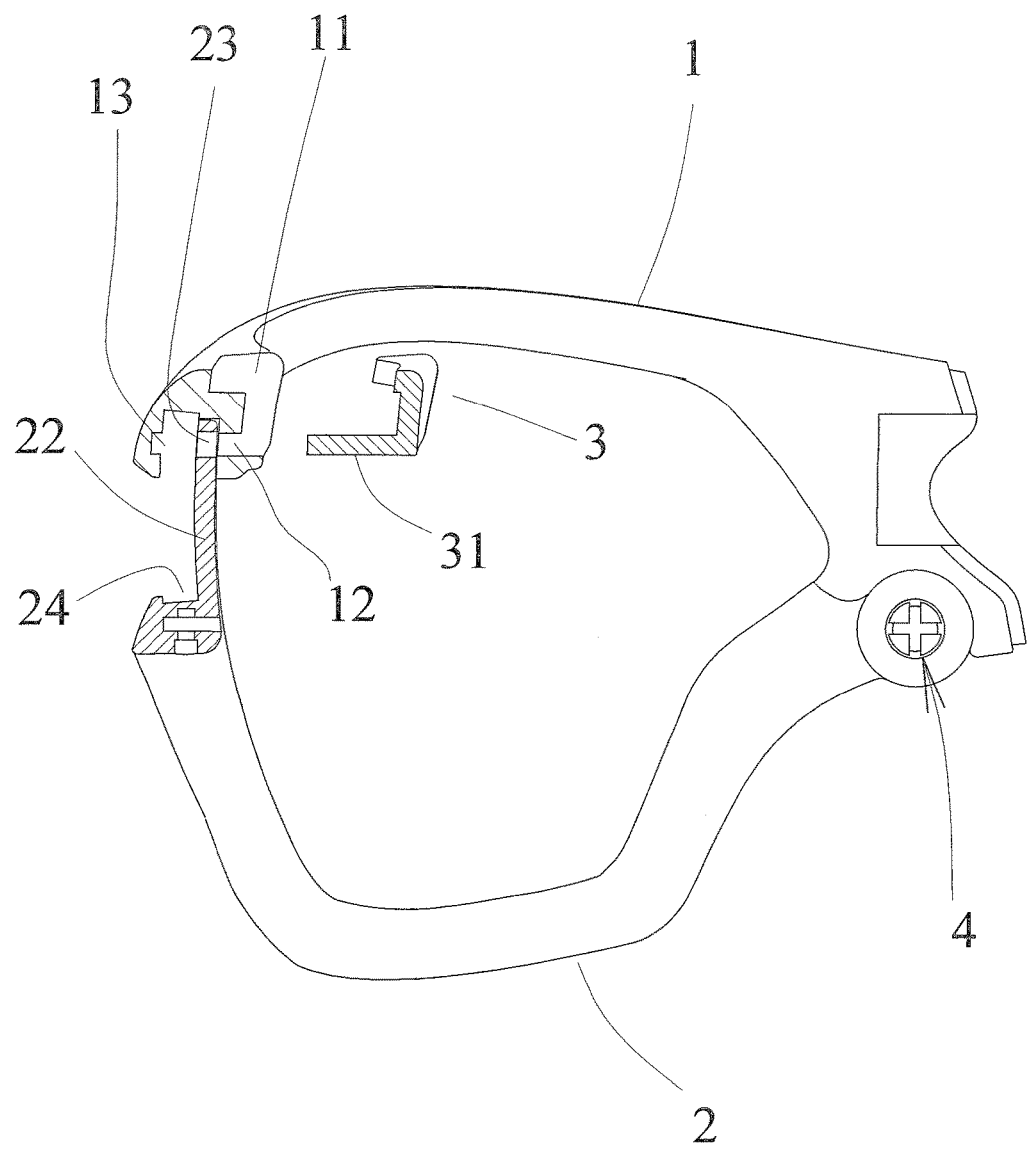
FIG. 3 is a side view of a quick-replacement structure of glasses lenses according to an embodiment of the present invention when the both ends of the upper frame and the lower frame are hinged on each other and the middle parts of them are connected.
Figure 4:
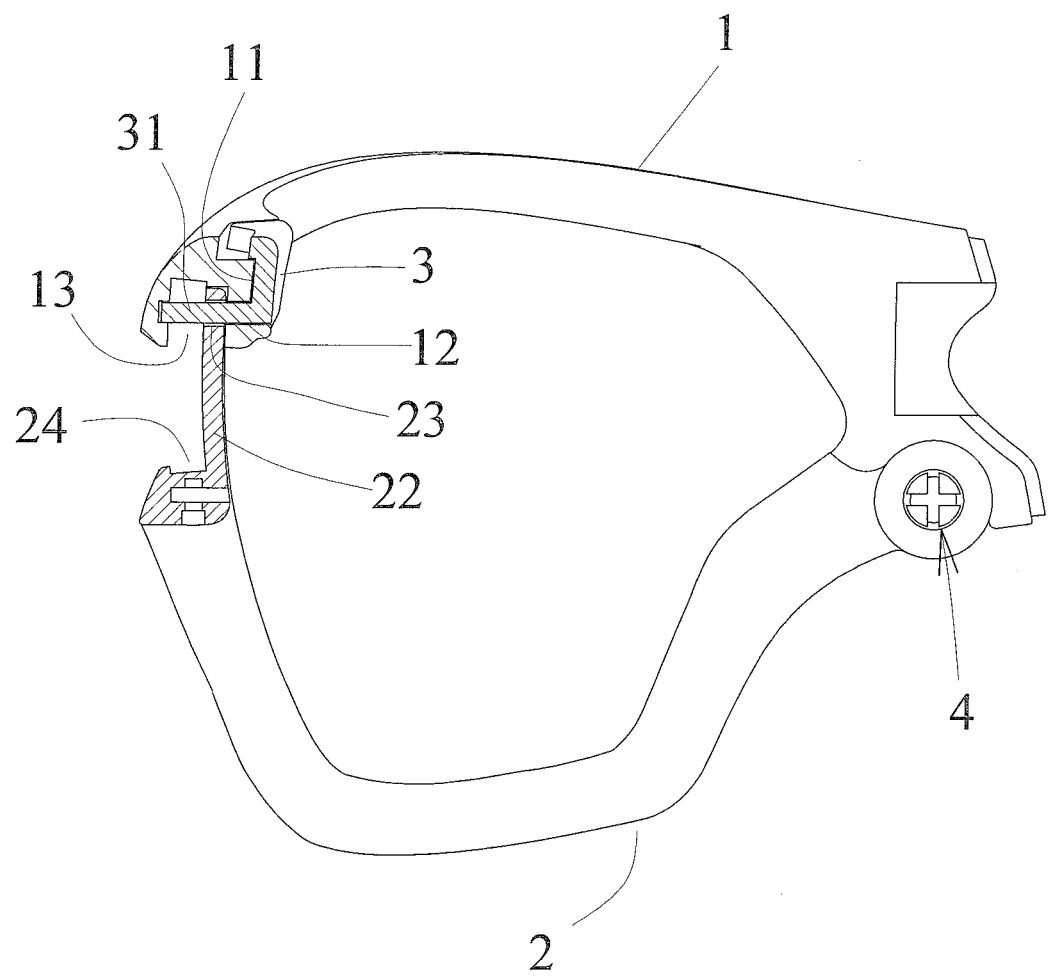
FIG. 4 is a side view of a quick-replacement structure of glasses lenses according to an embodiment of the present invention when the both ends of the upper frame and the lower frame are hinged on each other, the middle parts of them are connected and fixed by a fastener.

Please refer to FIG. 2, FIG. 3 and FIG. 4. When the lenses are disassembled to be replaced, the pin 4, which is at hinged ends of the upper frame 1 and the lower frame 2, is as the pivot to rotate the upper frame 1 and the lower frame 2 away from each other, then the bottom edge of the lenses (not shown) is embedded into the lower lens recess 24 at the lower frame 2. Next, the pin 4 is as the pivot again to rotate the upper frame 1 and the lower frame 2 toward to each other for embedding the top edge of the lenses into the upper lens recess 13 of the upper frame 1, making the upper frame 1 and the lower frame 2 clamping and fixing the lenses quickly, meanwhile, the insert 22 of the lower frame 2 is inserted into the upper lens recess 13, and the hole 23 in the insert 22 is corresponded to the slot 12 of the groove 11. Finally, the fastener 3 is embedded into the groove 11 and the inserted pin 31 is through the slot 12 and the hole 23 to fix the situation that the upper frame 1 and the lower frame 2 clamp the lenses.

What is claimed is:

1. A quick-replacement structure of glasses for lenses, comprising:
    an upper frame extending between two opposed terminal end parts, the upper frame including:
        a groove portion formed at a middle part of the upper frame, wherein the groove portion defines a substantially L-shaped sectional contour;
        a slot formed at a bottom of the groove portion and forwardly penetrating a wall of the upper frame; and
        an upper lens recess formed at a bottom of the upper frame;
    a lower frame extending between two opposed terminal ends, wherein each of the terminal ends of the lower frame is hinged to a corresponding one of the terminal end parts of the upper frame, the lower frame including:
        an insert portion upwardly extended from a middle section of the lower frame;
        a hole formed in the insert portion; and
        a lower lens recess formed at a top of the lower frame; and
    a fastener corresponding to the groove portion of the upper frame and formed with an inserted pin forwardly extended therefrom, wherein the fastener defines a substantially L-shaped sectional contour;
    wherein when the upper frame and the lower frame are pivoted to a clamping position relative to each other, the insert portion of the lower frame is inserted into the upper lens recess, the hole of the insert portion aligned with the slot of the groove portion, and the inserted pin of the fastener is coupled to engage both the slot and the hole and thereby quickly clamp the lenses between the upper frame and the lower frame.

2. The quick-replacement structure of glasses for lenses according to claim 1, wherein each of the terminal end parts of the upper frame is formed with a first pivot hole, each of the terminal ends of the lower frame is formed with a second pivot hole, and a pin is passed through aligned ones of the first and second pivot holes to pivotally couple the upper frame and the lower frame to each other.

3. The quick-replacement structure of glasses for lenses according to claim 2, wherein the pin includes a head part, a pole part, and a ball part, the ball part being disposed at the end of the pole part, and the pole part and the ball part being formed with a plurality of trenches for elastically expanding or tightening.

* * * * *